US008751562B2

(12) United States Patent
Zemer

(10) Patent No.: US 8,751,562 B2
(45) Date of Patent: Jun. 10, 2014

(54) SYSTEMS AND METHODS FOR PRE-RENDERING AN AUDIO REPRESENTATION OF TEXTUAL CONTENT FOR SUBSEQUENT PLAYBACK

(75) Inventor: Richard A. Zemer, Fishers, IN (US)

(73) Assignee: Voxx International Corporation, Hauppauge, NY (US)

( * ) Notice: Subject to any disclaimer, the term of this patent is extended or adjusted under 35 U.S.C. 154(b) by 591 days.

(21) Appl. No.: 12/429,794

(22) Filed: Apr. 24, 2009

(65) Prior Publication Data

US 2010/0274838 A1 Oct. 28, 2010

(51) Int. Cl.
*G06F 15/16* (2006.01)
*G10L 13/00* (2006.01)

(52) U.S. Cl.
USPC .......... 709/203; 704/258

(58) Field of Classification Search
CPC .......... G10L 13/00–13/10
USPC .......... 709/203; 704/587–258, 258–259, 704/E13.001–E13.014; 707/697–699
See application file for complete search history.

(56) References Cited

U.S. PATENT DOCUMENTS

| | | | | |
|---|---|---|---|---|
| 5,924,068 | A * | 7/1999 | Richard et al. | 704/260 |
| 6,571,256 | B1 * | 5/2003 | Dorian et al. | 726/2 |
| 6,600,814 | B1 * | 7/2003 | Carter et al. | 379/88.16 |
| 7,043,432 | B2 * | 5/2006 | Bakis et al. | 704/260 |
| 7,653,542 | B2 * | 1/2010 | Schultz et al. | 704/258 |
| 7,769,829 | B1 * | 8/2010 | Riggs et al. | 709/219 |
| 2003/0135373 | A1 * | 7/2003 | Diebolt et al. | 704/260 |
| 2003/0159035 | A1 * | 8/2003 | Orthlieb et al. | 713/168 |
| 2004/0054535 | A1 * | 3/2004 | Mackie et al. | 704/260 |
| 2004/0098250 | A1 * | 5/2004 | Kimchi et al. | 704/9 |
| 2006/0235885 | A1 * | 10/2006 | Steele et al. | 707/104.1 |
| 2007/0061711 | A1 * | 3/2007 | Bodin et al. | 715/523 |
| 2007/0100836 | A1 * | 5/2007 | Eichstaedt et al. | 707/10 |
| 2007/0101313 | A1 * | 5/2007 | Bodin et al. | 717/114 |
| 2007/0121651 | A1 * | 5/2007 | Casey et al. | 370/401 |
| 2007/0260643 | A1 * | 11/2007 | Borden et al. | 707/201 |
| 2009/0271202 | A1 * | 10/2009 | Takatsuka | 704/260 |
| 2010/0082350 | A1 * | 4/2010 | Schultz et al. | 704/260 |

FOREIGN PATENT DOCUMENTS

EP 1 870 805 12/2007

OTHER PUBLICATIONS

DE OA dated Apr. 12, 2012 for DE Patent Application No. 10 2010 028 063.1.

* cited by examiner

*Primary Examiner* — Brendan Higa
(74) *Attorney, Agent, or Firm* — F. Chau & Associates, LLC

(57) ABSTRACT

A system configured to pre-render an audio representation of textual content for subsequent playback includes a network, a source server, and a requesting device. The source server is configured to provide a plurality of textual content across the network. The requesting device includes a download unit, a signature generating unit, a signature comparing unit, and a text to speech conversion unit. The download unit is configured to download the plurality of textual content from the source server across the network. The signature generating unit is configured to generate a unique signature for each of the textual content. The signature comparing unit is configured to compare each unique signature with a prior corresponding signature to determine whether the corresponding textual content has changed. The text to speech conversion unit is configured to convert the textual content to speech when the textual content has been determined to have changed.

15 Claims, 9 Drawing Sheets

500

```
<?xml version="1.0" encoding="utf-8"?>
<aws:weather xmlns:aws="http://www.aws.com/aws">
        <aws:forecasts type="three-day" date="11-December-2008 03:54:00 AM">
        <aws:location>
                <aws:city>Fishers</aws:city>
                <aws:state>IN</aws:state>
                <aws:zip>46038</aws:zip>
                <aws:zone>IN039</aws:zone>
        </aws:location>
        <aws:forecast>
                <aws:title>Today</aws:title>
                <aws:short-title>Partly Cloudy</aws:short-title>
                <aws:image icon="cond003.gif">http://deskwx.weatherbug.com/images/
                Forecast/icons/cond003.gif</aws:image>
                <aws:description>Today</aws:description>
                <aws:prediction>Mostly cloudy until midday then becoming partly cloudy.
                Highs in the upper 30s. North winds 5 to 15 mph.
                </aws:prediction>
                <aws:high unit="&deg;F">37</aws:high>
                <aws:low unit="&deg;F">30</aws:low>
        </aws:forecast>
</aws:weather>
```

FIG. 5A

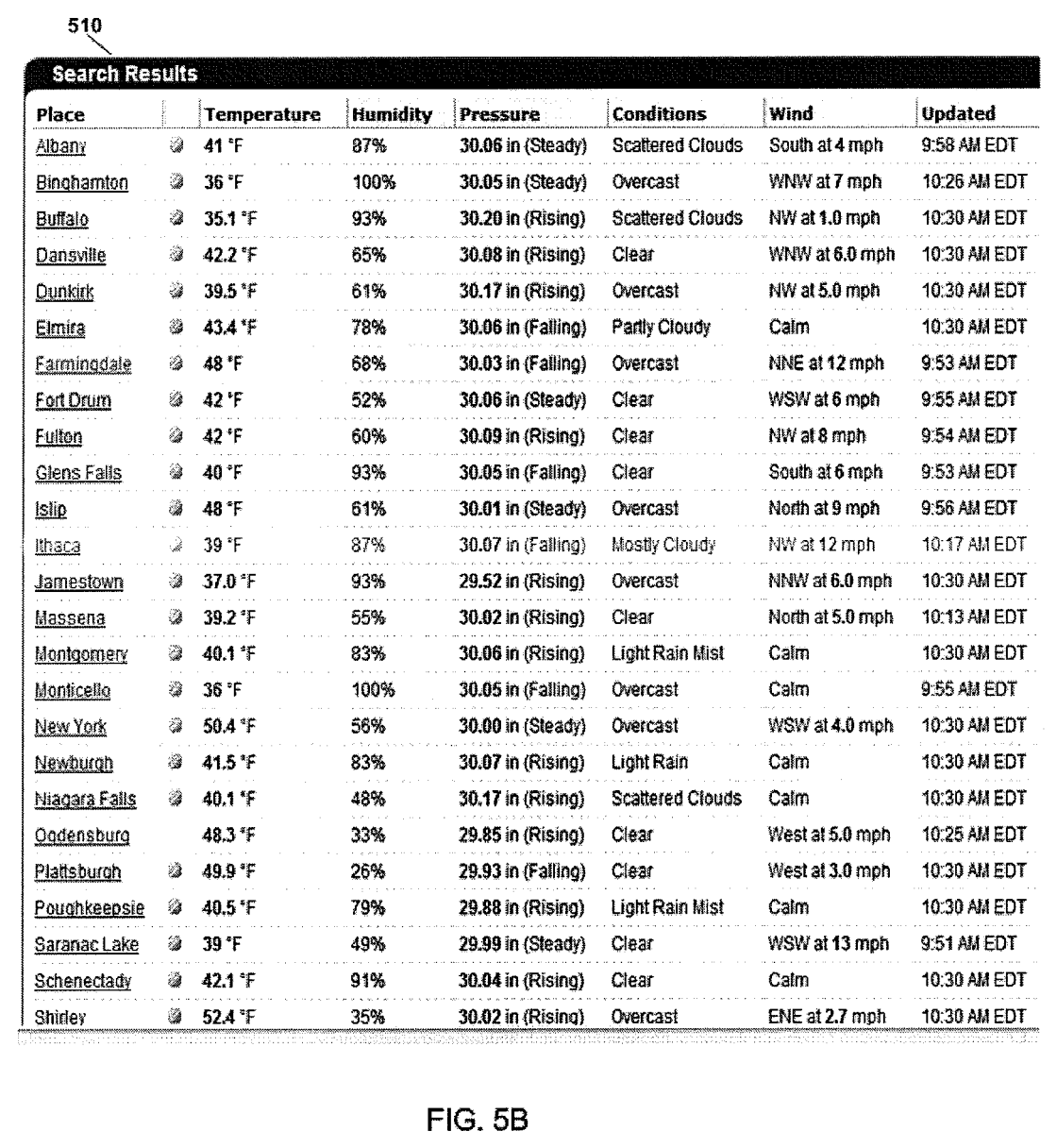

510

Search Results

| Place | Temperature | Humidity | Pressure | Conditions | Wind | Updated |
|---|---|---|---|---|---|---|
| Albany | 41 °F | 87% | 30.06 in (Steady) | Scattered Clouds | South at 4 mph | 9:58 AM EDT |
| Binghamton | 36 °F | 100% | 30.05 in (Steady) | Overcast | WNW at 7 mph | 10:26 AM EDT |
| Buffalo | 35.1 °F | 93% | 30.20 in (Rising) | Scattered Clouds | NW at 1.0 mph | 10:30 AM EDT |
| Dansville | 42.2 °F | 65% | 30.08 in (Rising) | Clear | WNW at 6.0 mph | 10:30 AM EDT |
| Dunkirk | 39.5 °F | 61% | 30.17 in (Rising) | Overcast | NW at 5.0 mph | 10:30 AM EDT |
| Elmira | 43.4 °F | 78% | 30.06 in (Falling) | Partly Cloudy | Calm | 10:30 AM EDT |
| Farmingdale | 48 °F | 68% | 30.03 in (Falling) | Overcast | NNE at 12 mph | 9:53 AM EDT |
| Fort Drum | 42 °F | 52% | 30.06 in (Steady) | Clear | WSW at 6 mph | 9:55 AM EDT |
| Fulton | 42 °F | 60% | 30.09 in (Rising) | Clear | NW at 8 mph | 9:54 AM EDT |
| Glens Falls | 40 °F | 93% | 30.05 in (Falling) | Clear | South at 6 mph | 9:53 AM EDT |
| Islip | 48 °F | 61% | 30.01 in (Steady) | Overcast | North at 9 mph | 9:56 AM EDT |
| Ithaca | 39 °F | 87% | 30.07 in (Falling) | Mostly Cloudy | NW at 12 mph | 10:17 AM EDT |
| Jamestown | 37.0 °F | 93% | 29.52 in (Rising) | Overcast | NNW at 6.0 mph | 10:30 AM EDT |
| Massena | 39.2 °F | 55% | 30.02 in (Rising) | Clear | North at 5.0 mph | 10:13 AM EDT |
| Montgomery | 40.1 °F | 83% | 30.06 in (Rising) | Light Rain Mist | Calm | 10:30 AM EDT |
| Monticello | 36 °F | 100% | 30.05 in (Falling) | Overcast | Calm | 9:55 AM EDT |
| New York | 50.4 °F | 56% | 30.00 in (Steady) | Overcast | WSW at 4.0 mph | 10:30 AM EDT |
| Newburgh | 41.5 °F | 83% | 30.07 in (Rising) | Light Rain | Calm | 10:30 AM EDT |
| Niagara Falls | 40.1 °F | 48% | 30.17 in (Rising) | Scattered Clouds | Calm | 10:30 AM EDT |
| Ogdensburg | 48.3 °F | 33% | 29.85 in (Rising) | Clear | West at 5.0 mph | 10:25 AM EDT |
| Plattsburgh | 49.9 °F | 26% | 29.93 in (Falling) | Clear | West at 3.0 mph | 10:30 AM EDT |
| Poughkeepsie | 40.5 °F | 79% | 29.88 in (Rising) | Light Rain Mist | Calm | 10:30 AM EDT |
| Saranac Lake | 39 °F | 49% | 29.99 in (Steady) | Clear | WSW at 13 mph | 9:51 AM EDT |
| Schenectady | 42.1 °F | 91% | 30.04 in (Rising) | Clear | Calm | 10:30 AM EDT |
| Shirley | 52.4 °F | 35% | 30.02 in (Rising) | Overcast | ENE at 2.7 mph | 10:30 AM EDT |

FIG. 5B

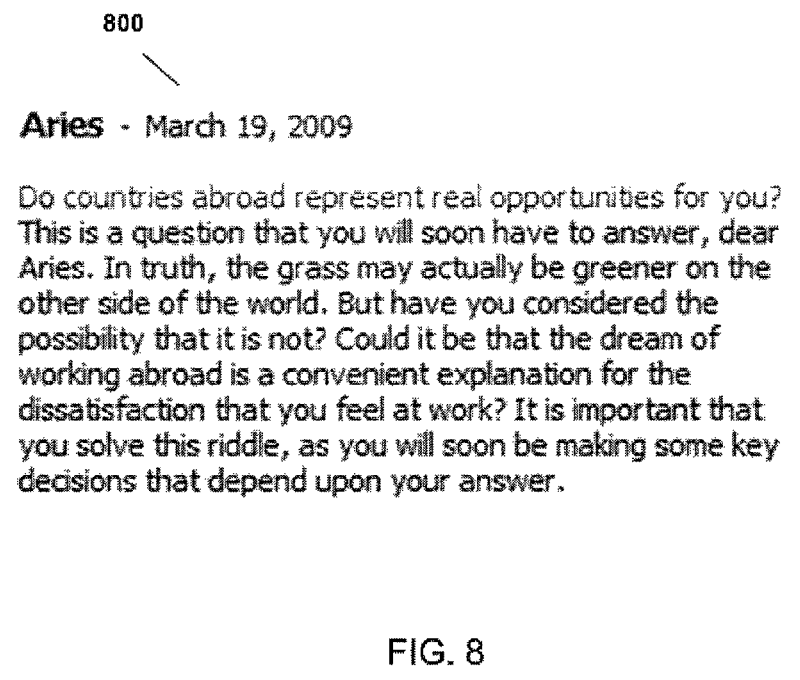

800

Aries - March 19, 2009

Do countries abroad represent real opportunities for you? This is a question that you will soon have to answer, dear Aries. In truth, the grass may actually be greener on the other side of the world. But have you considered the possibility that it is not? Could it be that the dream of working abroad is a convenient explanation for the dissatisfaction that you feel at work? It is important that you solve this riddle, as you will soon be making some key decisions that depend upon your answer.

FIG. 8

SYSTEMS AND METHODS FOR PRE-RENDERING AN AUDIO REPRESENTATION OF TEXTUAL CONTENT FOR SUBSEQUENT PLAYBACK

BACKGROUND OF THE INVENTION

1. Technical Field

The present disclosure relates to systems and methods pre-rendering an audio representation of textual Content for subsequent playback.

2. Discussion of Related Art

A great deal of content, such as weather and traffic reports, is available on the Web for download by users. This content can be downloaded for display on mobile devices and personal computers. Text of the content can be converted to speech on the local device using a conventional text to speech (TTS) algorithm for play on the local device. However, the actual conversion of text to speech can be a long and computationally intensive process and the resources of the local devices may be limited. Thus, a user typically experiences a noticeable delay between the time that content is requested and the time that an audible representation of text of that content is played.

Thus, there is a need for systems, devices, and methods that are capable of reducing this delay.

SUMMARY OF THE INVENTION

An exemplary embodiment of the present invention includes a system configured to pre-render an audio representation of textual content for subsequent playback. The system includes a network, a source server, and a requesting device. The source server is configured to provide a plurality of textual content across the network. The requesting device includes a download unit, signature generating unit, a signature comparing unit, and a text to speech conversion unit. The download unit is configured to download the plurality of textual content from the source server across the network. The signature generating unit is configured to generate a unique signature for each of the textual content. The signature comparing unit is configured to compare each unique signature with a prior corresponding signature to determine whether the corresponding textual content has changed. The text to speech conversion unit is configured to convert the textual content to speech when the textual content has been determined to have changed.

The requesting device may be configured to pre-fetch the textual content at a periodic download rate. The requesting device may further include a storage device to store the signatures, the downloaded content, and a preference file to store content types of the textual content to be downloaded and the periodic download rates of each of the content types.

The requesting device may further include a media player configured to play the speech. The signature generating unit may use a message digest (MD) hashing algorithm to generate the unique signatures. Each of the unique signatures may be MD5 signatures. The plurality of textual content may be in an XML format. The textual content may include at least one of an Aviation Routine Weather Report (METAR) format or a Terminal Aerodrome Format (TAF).

The system may further include parser that is configured to parse the textual content into tokens and a converter to convert at least part of the tokens into human readable text. The plurality of textual content may further include at least one of weather reports, traffic reports, horoscopes, recipes, or news.

An exemplary embodiment of the present invention includes a method to pre-render an audio representation of textual content for subsequent playback. The method includes: reading in content type to pre-fetch and a corresponding pre-fetch rate, pre-fetching textual content for the content type, converting the text content to speech, computing a current unique signature from the textual content, and starting a timer based on the pre-fetch rate, downloading new textual content for the content type after the timer has stopped and computing a new unique signature from the new textual content, and converting the new textual content to speech only when the current unique signature differs from the new unique signature.

The computing of the unique signatures may include: performing one of a message digest (MD) hashing algorithm or secure hash algorithm (SHA) on at least part of the corresponding textual content. The method may further include playing the speech locally at a subsequent time. The method may further include uploading the speech to a remote server from which the textual content originated. The method may further include: downloading the uploaded speech to a requesting device and playing the downloaded speech locally on the requesting device.

An exemplary embodiment of the present invention includes a method to pre-render an audio representation of textual content for subsequent playback. The method included: downloading a current unique signature for textual content of a selected content type upon determining that textual content for that content type has been previously downloaded, comparing the current unique signature with a previously downloaded unique signature that corresponds to the previously downloaded textual content, downloading new textual content that corresponds to the current unique signature only when the comparison indicates that the signatures do not match, and converting the new textual content to speech if the new textual content is downloaded.

The downloading of the new textual content may further configured such that it is only performed after a predetermined time period has elapsed. The plurality of textual content may include at least one of weather reports, traffic reports, horoscopes, recipes, or news. The computing of the unique signatures may include performing one of a message digest (MD) hashing algorithm or secure hash algorithm (SHA) on at least part of the corresponding textual content. The method may further include: uploading the speech to a remote server from which the textual content originated, downloading the uploaded speech to a requesting device, and playing the downloaded speech locally on the requesting device.

BRIEF DESCRIPTION OF THE DRAWINGS

Exemplary embodiments of the invention can be understood in more detail from the following descriptions taken in conjunction with the accompanying drawings in which:

FIG. 5*a* and FIG. 5*b* illustrate examples of weather report content that may be processed by the system and methods of the present invention;

FIG. 8 illustrates an example of horoscope content that may be processed by the system and methods of the present invention.

DETAILED DESCRIPTION OF THE EXEMPLARY EMBODIMENTS

Exemplary embodiments of the present invention will be described below in more detail with reference to the accompanying drawings. This invention may, however, be embodied in different forms and should not be construed as limited to the embodiments set forth herein.

It is to be understood that the present invention may be implemented in various forms of hardware, software, firmware, special purpose processors, or a combination thereof. The present invention may be implemented as a combination of both hardware and software, the software being an application program tangibly embodied on a program storage device. The application program may be uploaded to, and executed by, a machine comprising any suitable architecture. The machine may be implemented on a computer platform having hardware such as one or more central processing units (CPU), a random access memory (RAM), and input/output (I/O) interface(s). The computer platform may also include an operating system and microinstruction code. The various processes and functions described herein may either be part of the microinstruction code or part of the application program (or a combination thereof) which is executed via the operating system. In addition, various other peripheral devices may be connected to the computer platform such as an additional data storage device.

Figure 1:
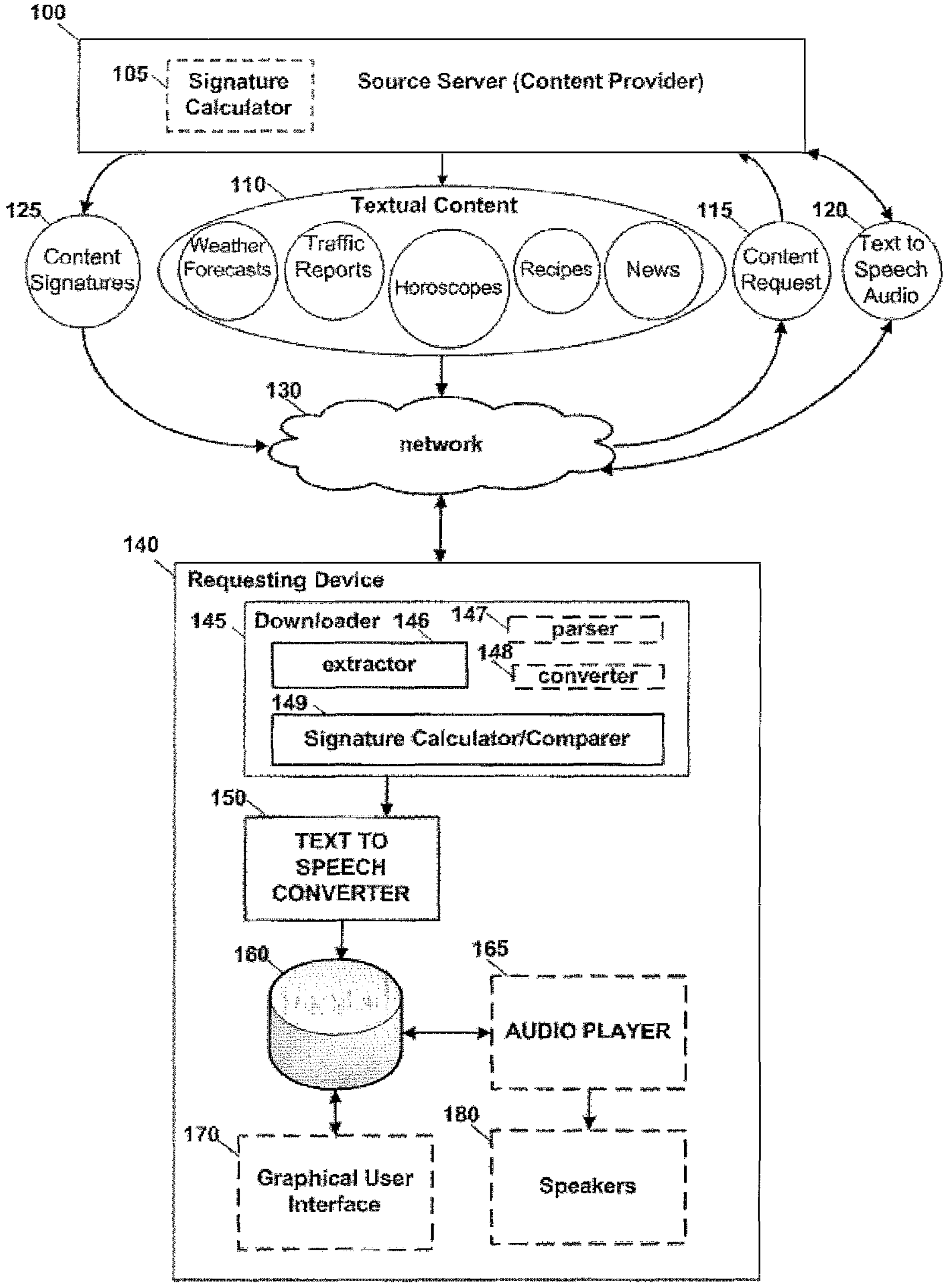
FIG. 1 illustrates a system configured to pre-render an audio representation of textual content for subsequent playback, according to an exemplary embodiment of the present invention.

FIG. 1 illustrates a system to pre-render an audio representation of textual content for subsequent playback, according to an exemplary embodiment of the present invention. Referring to FIG. 1, the system includes a source server 100 and a requesting device 140. The source server 100 provides textual content 110 to the requesting device 140 over the internet 130. For example, the textual content 110 may include weather reports (e.g., forecasts or current data), traffic reports, horoscopes, news, recipes, etc.

The requesting device 140 includes a downloader 145, a text to speech (TTS) converter 150, and storage 160. The requesting device 140 communicates with the source sever 100 across a network 130. Although not shown in FIG. 1, the network may be the internet, an extranet via Wi-Fi, or a Wireless Wide-Area Network (WWANS), a personal area network (PAN) using Bluetooth, etc. The requesting device 140 may be a mobile device or personal computer (PC), which may further employ touch screen technology and/or a keyboard. Instead of being handheld, or housed within a PC, the requesting device 140 may be installed within various vehicles such as an automobile, an aircraft, a boat, an air traffic control/management device, etc.

The downloader 145 may periodically download textual content 110 received over the network 130 from the source server 100. The types of content to be downloaded and downloads rate of each content type may be predefined in a preference file stored in the storage 160. Although not shown in FIG. 1, the downloader 145 may include one or more software or hardware timers, which may be used to determine when a periodic download is to be performed. The downloader 145 may independently download the textual content from the source server 100. Alternately, the downloader 145 sends specific content requests 115 for a particular content type to the source server 100, and in response, the source server 100 sends the corresponding textual content 110 over the network 130 for receipt by the downloader 145.

The downloader 145 may download/receive the textual content 110 across the network in the form of packets. The downloader 145 may include an extractor 146 that extracts the payload data from the packets. The data in the payload may already be in a proper textual form, and can thus be forwarded onto the TTS converter 150. For example, FIG. 8 shows an example of the textual content 110 being a horoscope 800.

However, textual content 110 may need to be reformatted and/or converted into a proper format before it can be forwarded to the TTS 150 for conversion to speech. The downloader 145 may include a parser 147 and/or a converter 148 to perform additional processing on the payload data. The parser 147 can parse the textual content 110 into tokens and the converter 148 can convert some or all of the tokens into human readable text.

For example, the data may be received in an Extensible Markup Language (XML) format 500, such as in FIG. 5A. The parser 147 can parse for first textual data in each XML tag, parse between begin-end XML tags for second textual data, and correlate the first textual data with the second textual data. For example, referring to FIG. 5A, the text for "prediction" may be parsed from the begin <aws:prediction> tag, the text for "Mostly cloudy until midday . . . " may be parsed from data between the begin <aws:prediction> tag and the end </aws:prediction> tag, and the data may be correlated to read "prediction is Mostly cloudy until midday . . . ". In this example, the data has been retrieved from Weatherbug.com, which uses a report from the National Weather Service (NWS). Accordingly, for this example, it is assumed that the Source Server (100) has access to the Weatherbug.com website (e.g., it is connected to the internet).

As another example, the data may be received in a table 510 form, such as in FIG. 5B. The parser 147 can parse each row/column of the table 510 for data from individual fields and correlate them with their respective headings to generate textual data (e.g., "place is Albany", "Temperature is 41° F.", etc). The converter 148 can convert abbreviations into their equivalent words, such converting "F" to "Fahrenheit".

Figure 6:
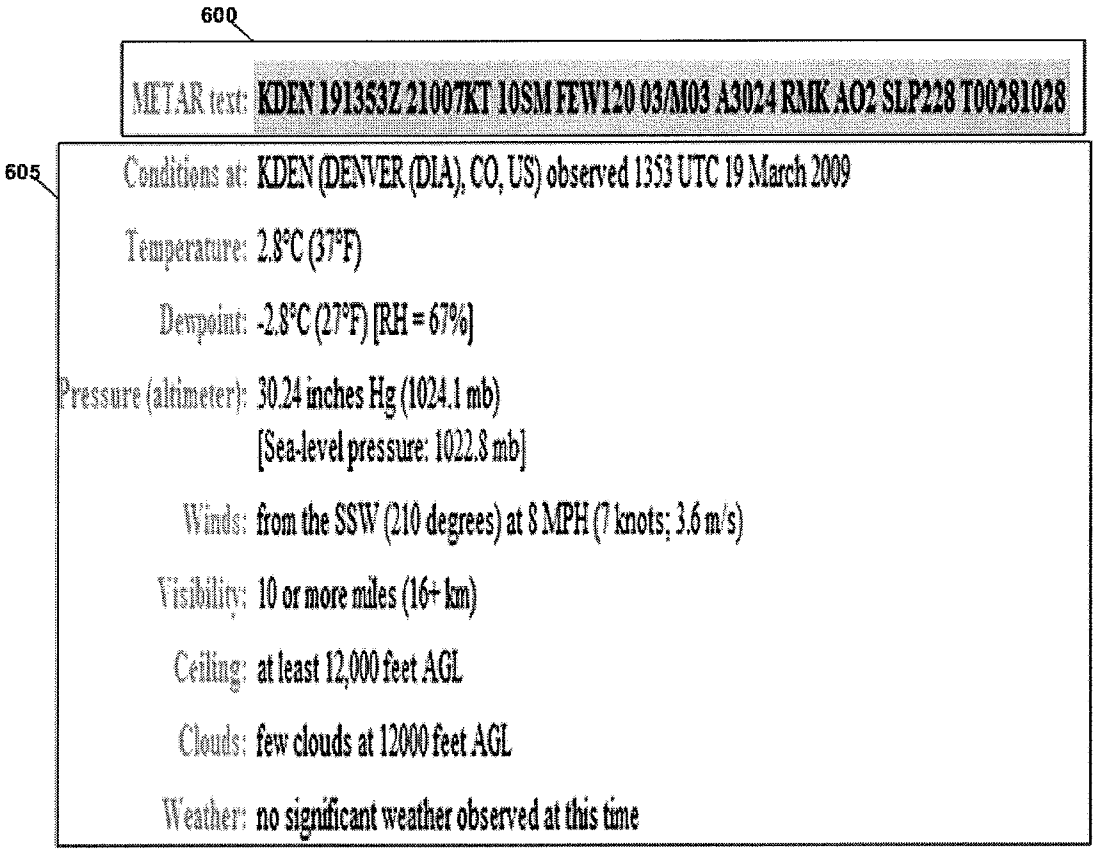
FIG. 6 illustrates another example of weather report content that may be processed by the system and methods of the present invention.
Figure 7:
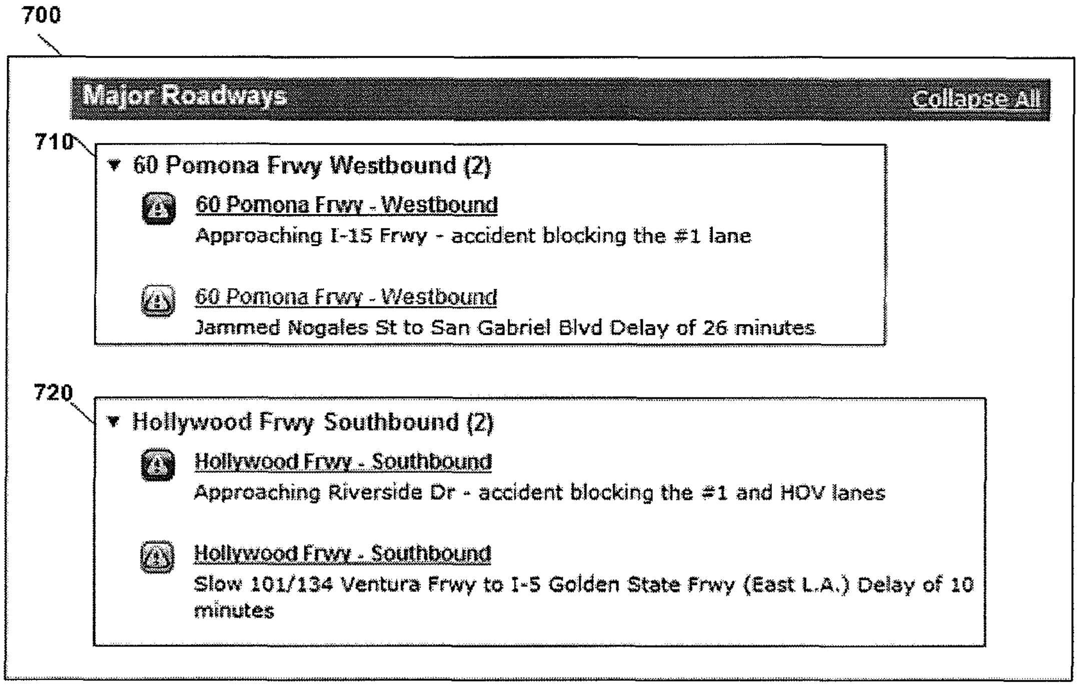
FIG. 7 illustrates an example of traffic report content that may be processed by the system and methods of the present invention.

In another example, the data of the textual content 110 may be received in a coded/shorthand standard, such as in an Aviation Routine Weather Report (METAR) 600 as in FIG. 6 or a terminal aerodrome format (TAF). The parser 147 can parse the data into coded/shorthand tokens and then the converter 148 can convert some or all of the tokens into a human readable text 605. For example, the token of "KDEN" is an international civil aviation organization (ICAO) location indicator that corresponds to "Denver", the token of "FEW120" corresponds to "few clouds at 12000 feet", etc. Some of the tokens do not need to be converted into human readable text. For example, the "RMK" token is used to mark the end of a standard METAR observation and/or to mark the presence of optional remarks. The requesting device 140 may include a mapping table to map four letter ICAO codes to human readable text.

In another example, as shown in FIG. 5, the traffic report data may stored as a bulleted list 500, with a first entry 510 for a first road and a second entry 520 for a second road. The parser 147 can then parse the individual textual data items from the list 500 and the converter 148 can then convert any coded/shorthand words. For example, the converter 148 could be used to convert "Frwy" in entries 510 and 520 to "Freeway".

In an alternate embodiment of the system, a parser, converter, and/or extractor (not shown) may be included in the source server 100. In this way, the source server 100 can perform any needed data parsing, extraction, or conversion before the textual content 110 is sent out so it may be directly forwarded from the downloader 145 to the TTS converter 150 without pre-processing or excessive pre-processing.

The TTS converter 150 converts the text of the textual content 110 into speech and stores the speech as an audio file. For example, the audio may include various formats such as wave, ogg, mpc, flac, aiff, raw, au, mid, qsm, dct, vox, aac, mp4, mmf, mp3, wma, atrac, ra, ram, dss, msv, dvf, etc. The audio file may be stored in the storage 160. The audio file may be named using its content type (e.g., weather_albany.mp3). The storage 160 may include a relational database and the audio files can be stored in the database. For example, the database may DB2, Informix, Microsoft Access, Sybase, Oracle, Ingress, MySQL, etc.

The requesting device 140 may include an audio player 165 that is configured to read in the audio files for play on speakers 180. The audio player 165 may be a media/video player, as media/video players are also configured to play audio. For example, the audio player may be implemented by various media players such as RealPlayer, Winamp, etc. The requesting device 140 may also include a graphical user interface (GUI) 170 to display text corresponding to the audio file while the audio file is being played. The GUI 170 may used by a user to edit the preference file, to select/add particular content to be downloaded, to set the particular download rates, etc.

Resources and energy are consumed whenever a text to speech conversion is performed by the TTS converter 150. Further, text to speech conversion can take a long time, which may result in a noticeable delay from the time the textual content is requested to the time its audio representation is played. Thus, it would be beneficial to be able to limit the number of text to speech conversions performed. For example, the downloader 145 may be configured to only pass on the downloaded textual content 110 to the TTS converter 150 when it contains new data. For example, the weather report for a particular city may remain the same for several hours, until it finally changes.

The downloader 145 includes a signature calculator/comparer 149 that creates a unique signature from the downloaded textual content 110 and compares the signature with prior signatures. If the signatures match, the corresponding downloaded textual content 110 may be passed onto the TTS converter 150 for conversion. For example, assume a previously downloaded weather report for Albany, having a temperature of 41 degrees Fahrenheit, and humidity of eighty seven percent, was hashed by the signature calculator to a unique signature of 0x0ff34d3h. Assume next, a subsequent download of the weather report for Albany is hashed to a unique signature of 0x0ff34d7h (e.g., the temperature has changed to 42 degrees Fahrenheit) by the signature calculator. The signature comparer compares the two signatures, and in this example, determines that the weather report for Albany has changed because the signatures of 0x0ff34d3h and 0x0ff34d7h differ from one another. The downloader 140 can then forward the downloaded textual content 110 onto the TTS converter 150. However, if the signatures are the same, the new downloaded content can be discarded. The downloader 145 may include a storage buffer (not shown) for storing currently downloaded textual content 110 and the corresponding signatures calculated by the signature calculator.

While the extractor 147, parser 148, converter and signature calculator/comparer 149 are illustrated in FIG. 1 as being included within the a unit responsible for downloading the textual content 110, i.e., the downloader 145, each of these elements may be provided within different modules of the requesting device 140.

In another embodiment of the present invention, a signature calculator 105 is included within the source server 100. The source server can then calculate a signature on respective textual content 110 and may include a storage buffer (not shown) for storing the textual content 110 and corresponding signatures. In the following example, it is assumed that the downloader 140 has already downloaded the weather report for Albany and computed a signature for the weather report. However, the next time the downloader 140 is set to download the weather report for Albany, the downloader 140 can instead merely download the corresponding content signature 125 from the source server 100 and compare the downloaded content signature 125 with the prior downloaded signature. If the signatures match, then there is no need for the downloader 140 to download the same weather report. However, if the signatures do not match, the downloader 140 downloads the new weather report for conversion into speech by the TTS converter 150.

In an exemplary embodiment of the present invention, the signature calculator(s) 105/149 use a Message-Digest hashing algorithm (e.g., MD4, MD5, etc.) on textual content 110 to generate the unique signature. However, embodiments of the signature calculator(s) 105/149 are not limited thereto. For example, the signature calculator(s) 105/149 may be configured to generate a signature using other methods, such as a secure hash algorithm (SHA-1, SHA-2, SHA-3, etc.)

Figure 2:
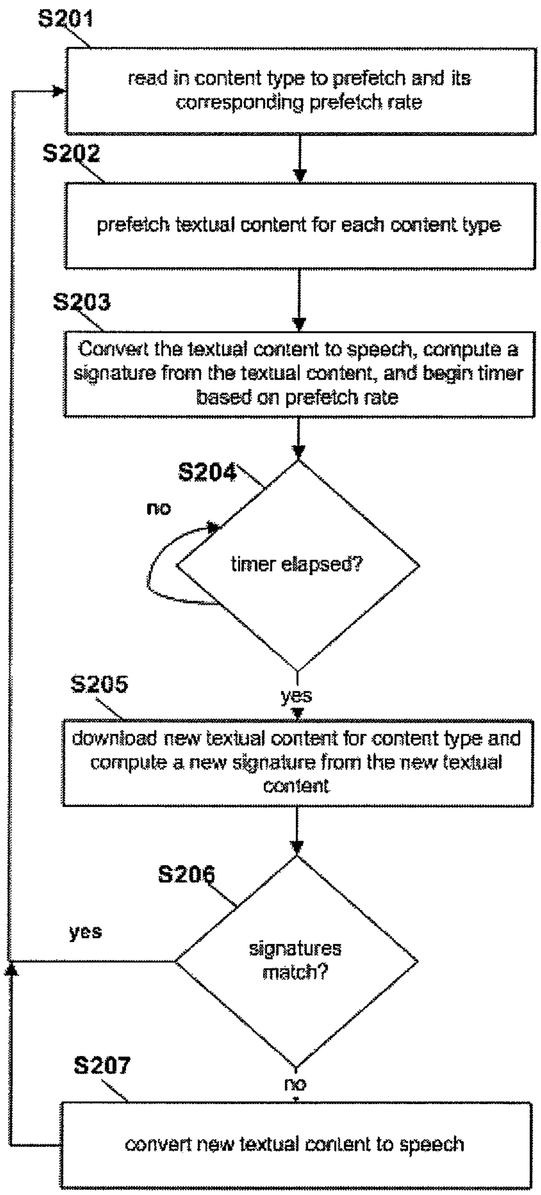
FIG. 2 illustrates a method to pre-render an audio representation of textual content for subsequent playback, according to an exemplary embodiment of the present invention.

FIG. 2 illustrates a method to pre-render an audio representation of textual content for subsequent playback, according to an exemplary embodiment of the present invention. Referring to FIG. 2, the method includes reading in content type to pre-fetch and a corresponding pre-fetch rate (S201). The data may be read in from a predefined preference file, which can be edited using the GUI 170. Textual content for the content type can then be pre-fetched/downloaded from a remote source, such as the source server 100 (S202). The textual content is then downloaded, a unique signature is generated from the downloaded textual content, and a timer is started based on the read pre-fetch rate (S203). A check is made to determine whether the timer has stopped (S204). If the timer has stopped, then new textual content for the same content type is downloaded and a new unique signature is generated from the newly downloaded textual content (S205). The content type may be fairy specific, such the weather forecast for Albany, the traffic report for route 110 in New York, etc. A determination is then made as to whether the signatures match (S206). If the signatures do not match, then the newly downloaded textual content is converted to speech (S207). If the signatures do match, the method can resume to step S201 for a next content type (e.g., weather report for Binghampton).

Figure 3:
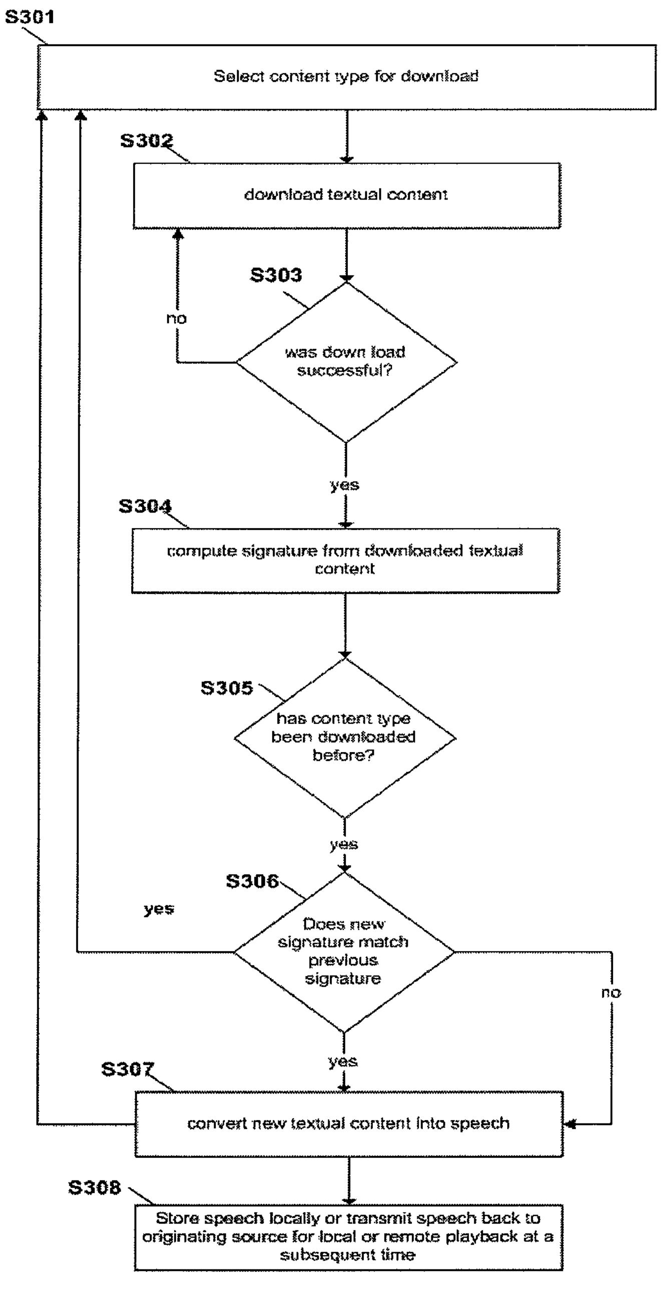
FIG. 3 illustrates a method pre-render an audio representation of textual content for subsequent playback, according to an exemplary embodiment of the present invention.
Figure 4:
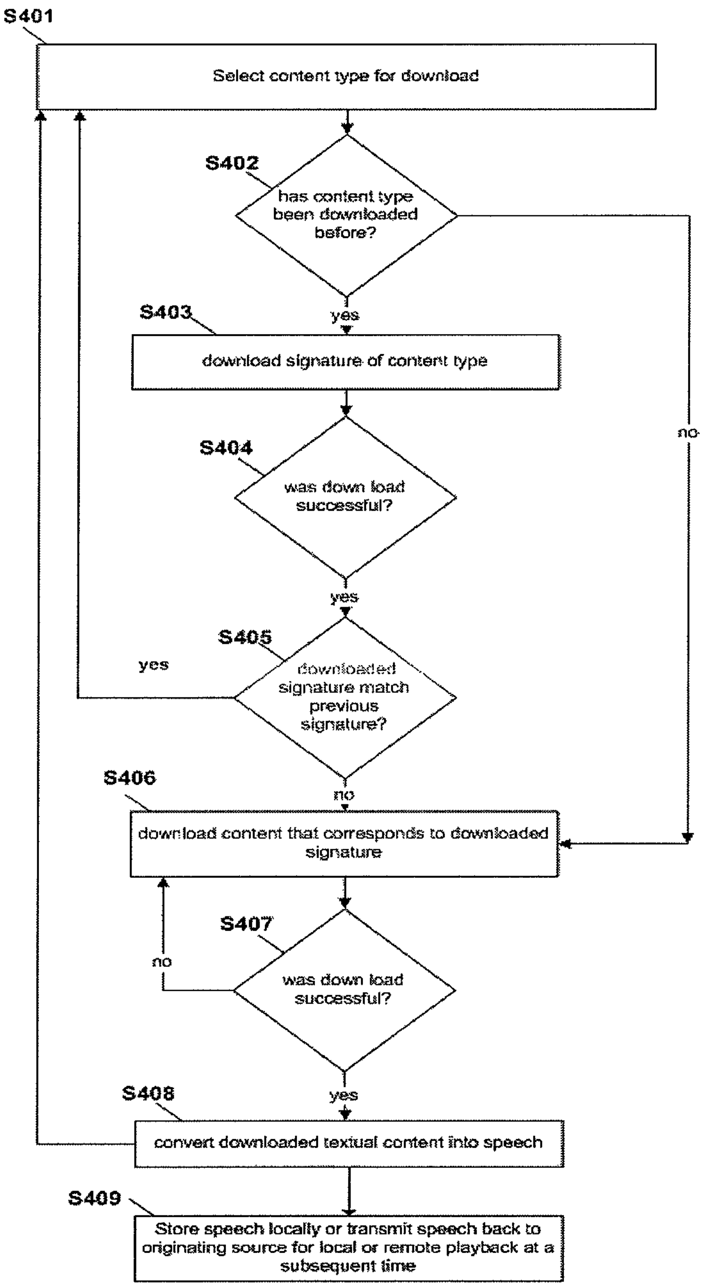
FIG. 4 illustrates a method pre-render an audio representation of textual content for subsequent playback, according to an exemplary embodiment of the present invention.

FIG. 3 illustrates a variation of the method of FIG. 2. The method includes selecting a content type for download (S301). It is then determined whether data of that content type has been downloaded before (S302). This determination may be made by searching for the presence of previously downloaded textual content of the content type and/or the presence of its previously computed signature. Previously downloaded textual content and computed signatures may be stored in storage 160 as variables or as files. For example, assume textual content and a signature for a weather report for Albany is present from a previous download.

Since the data is present for the content type, new textual content is downloaded (e.g., from the source server 100) (S303). A check is then performed to determine whether the download was successful (S304). If the download was not successful, the above downloading step may be repeated until a successful download or until a predefined maximum number of download attempts have been made. The maximum number of download attempts times may be stored in the preference file. When the download is successful, a new signature is computed from the newly downloaded textual content (S305). For example, the signature may be computed using Message-Digest hashing, Secure Hashing, etc.

Next a comparison is performed on the newly computed signature and the previous computed signature of the same content type to determine whether they match (S306). If the signatures match, the method can return to the step of selecting a content type for download. If the signatures do not match, the newly downloaded textual content is converted into speech (S307). The speech is stored as an audio file (e.g., MP3, etc.).

The audio file may be stored locally for a subsequent local playback and/or uploaded back to the originating source for local play on the originating source and/or remote play on a remote workstation (e.g., the requesting device 140 or another remote workstation) at a subsequent time (S308). Since the resources of the requesting device 140 may be limited, the requesting device 140 may discard the audio file after it has uploaded the file to the source server 100. The requesting device 140 may of course retain storage of some of the audio files for local playback. At a later time, the requesting device 140 or another remote workstation can directly download or request textual content from the source server 100 and directly receive the text to speech audio 120, without having to perform a text to speech conversion.

The requesting device 140 can be programmed to pre-fetch textual content so that the text to speech conversions may be done in advance, so that subsequent playbacks do not experience the delay associated with converting textual content into speech.

The requesting device 140 may service a list of users/subscribers, where each user/subscriber has different content interests. For example, one user/subscriber may be interested in traffic reports, while another is interested in weather reports.

The requesting device 140 can download the content of interest in advance and perform text to speech conversions in advance of when they are requested by the user/subscriber. Local users/subscribers can listen to their content on the requesting device 140. Remote users/subscribers can download the speech version of their content for remote listing from the source server 100 (e.g., upon upload by the requesting device 140) or from the requesting device 140. In this way, an audio representation of the requested textual content can be provided in an on-demand manner.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

What is claimed is:

1. A system configured to pre-render an audio representation of textual content for subsequent playback, the system comprising:

a requesting device comprising:

a memory configured to store a computer program; and a processor configured to execute the computer program, wherein the computer program comprises:

a download unit configured to download first textual content of a content type from a remote source server across a computer network;

a signature generating unit configured to locally generate a first signature from the downloaded first textual content, wherein the first signature identifies the first textual content;

a signature comparing unit configured to locally compare the first signature with a second signature identifying a previously downloaded second textual content of the same content type to determine whether the second textual content differs from the first textual content;

a text to speech conversion unit configured to convert the first textual content to speech only when the signature comparing unit determines that the second textual content differs from the first textual content; and wherein, when resources of the requesting device are limited, the requesting device is configured to transfer the speech to the remote source server and remove the speech from itself.

2. The system of claim 1, wherein the requesting device is configured to pre-fetch textual content of the same content type at a periodic download rate.

3. The system of claim 1, wherein the requesting device further comprises a storage device to store the signatures, the downloaded textual content, and a preference file to store content types of the textual content to be downloaded and the periodic download rates of each of the content types.

4. The system of claim 1, wherein the requesting device further comprises a media player configured to play the speech.

5. The system of claim 1, wherein the signature generating unit uses a message digest (MD) hashing algorithm to generate the signatures.

6. The system of claim 5, wherein each of the signatures are MD5 signatures.

7. The system of claim 1, wherein the textual content is in an Extensible Markup Language (XML) format.

8. The system of claim 1, wherein the textual content includes at least one of an Aviation Routine Weather Report (METAR) format or a Terminal Aerodrome Format (TAF).

9. The system of claim 1, further comprising:

a parser that is configured to parse the textual content into tokens; and a converter to convert at least part of the tokens into human readable text.

10. The system of claim 1, wherein the content type indicates that the first textual content is one of a weather report, a traffic report, a horoscope, a recipe, or a news report.

11. The system of claim 1, wherein, during a subsequent download period when the speech is present on the server, the requesting device is configured to download the speech from the server instead of textual content of the content type to play the speech.

12. A method to pre-render an audio representation of textual content for subsequent playback, the method comprising:

downloading, by a first device, first textual content of a content type during a first period from a server remote from the first device;

converting, by the first device, the first textual content to first speech;

computing, by the first device, a first signature from the first textual content that identifies the first textual content;

downloading, by the first device, second textual content for the same content type from the server during a second period after the first period;

computing, by the first device, a second signature from the second textual content that identifies the second textual content;

converting, by the first device, the second textual content to second speech only when the first signature differs from the second signature; and when resources of the first device are limited, transferring the first or second speech from the first device to the server and removing the transferred speech from the first device.

13. The method of claim 12, wherein the computing of the signatures comprises performing a secure hash algorithm (SHA) on at least part of the corresponding textual content.

14. The method of claim 12, further comprising:

downloading, by a second device remote from the server and the first device, the transferred speech from the r-emote server; and playing the downloaded transferred speech locally on the second device.

15. The method of claim 12, further comprising, during a subsequent download period when the transferred speech is present on the server, the first device downloading the transferred speech from the server instead of third textual content of the content type to play the transferred speech.

* * * * *